219-121
MTR04 XR 3,900,737 SR

United States Patent [19]

Collier et al.

[11] 3,900,737
[45] Aug. 19, 1975

[54] ELECTRON BEAM EXPOSURE SYSTEM

[75] Inventors: Robert Jacob Collier, New Providence; Donald Richard Herriott, Morris Twp., Morris County, both of N.J.

[73] Assignee: Bell Telephone Laboratories, Incorporated, Murray Hill, N.J.

[22] Filed: Apr. 18, 1974

[21] Appl. No.: 461,876

[52] U.S. Cl. ........................ 250/492 A; 219/121 EB
[51] Int. Cl. ........................ H01j 37/26; B23k 9/00
[58] Field of Search ........................ 250/492 A, 310; 219/121 EB

[56] References Cited

UNITED STATES PATENTS 3,644,700 2/1972 Kruppa .......................... 250/492 A

OTHER PUBLICATIONS

Samaroo et al., "The Electron Beam Pattern Generator," Bell System Technical Journal, Vol. 49, No. 9, Nov. 1970, pp. 2,077–2,094.

Chang et al., "A Computer-Controlled Electron-Beam Machine for Microcircuit Fabrication," IEEE Trans. Electron Dev. Vol. ED-19 No. 5, May 1972, pp. 629–635.

*Primary Examiner*—James W. Lawrence
*Assistant Examiner*—T. N. Grigsby
*Attorney, Agent, or Firm*—L. C. Canepa

[57] ABSTRACT

An electron beam exposure system includes an electron column characterized by a high scanning rate and a limited scan area. Illustratively, the medium to be exposed constitutes a relatively large area made up of multiple subregions that are to be identically patterned. Efficient and high-speed exposure of the large-area medium is achieved by carrying the medium on a motor-driven stage. The stage moves continuously and in synchronism with the beam which is successively scanned raster fashion over corresponding stripe areas in the subregions. All similarly situated stripe areas are repeatedly exposed with the same pattern as the medium is translated in a serpentine path under the beam.

13 Claims, 3 Drawing Figures

ELECTRON BEAM EXPOSURE SYSTEM

BACKGROUND OF THE INVENTION

This invention relates to the fabrication of microminiature devices and, more particularly, to an automated high-speed electron beam apparatus and method for making such devices.

The high-resolution and excellent depth-of-focus capabilites of an electron beam make it an attractive tool for inclusion in an automated lithography system designed to make microminiature electronic devices. By controlling the beam in a highly accurate and high-speed manner it is possible, for example, to make masks or to write directly on an electron-resist-coated wafer of silicon to fabricate extremely small and precise low-cost integrated circuits.

It is known that the controllable beam in an electron lithographic system can be deflected and blanked in a high-speed manner. But, typically, the area over which the beam is capable of being deflected is relatively small. Accordingly a basic problem presented to the designers of such a system is how to accommodate this small-area-scan field to the rapid and efficient exposure of relatively large resist-coated areas.

SUMMARY OF THE INVENTION

An object of the present invention is an improved electron beam exposure system and method.

More specifically, an object of this invention is an electron beam system and method whose exposure strategy is tailored uniquely to the high-line-scanning-rate and limited-scan-area characteristics of the electron beam included in the system.

Briefly, these and other objects of the present invention are realized in a specific illustrative embodiment thereof in which large-area coverage by the electron beam is achieved by carrying the medium to be exposed on a motor-driven stage. The stage moves continuously and in synchronism with the beam which is scanned raster fashion in a direction perpendicular to stage motion. Typically, the medium comprises multiple regions in which identical patterns are to be respectively formed. Illustratively, the subregions are disposed in an array of rows and columns.

In one specific embodiment, the leftmost stripe area in each of the subregions in the leftmost or first column of the array is repeatedly exposed in accordance with the same pattern information. After exposing the leftmost stripe area in the last subregion in the first column, the medium is moved to position the beam over the leftmost stripe area of the next adjacent subregion in the second column of the array.

The medium is moved in a serpentine path until the leftmost stripe areas on all the subregions have been identically exposed. The while the medium is moved to position the beam over the stripe area directly adjacent the first-exposed stripe area, the memory whose contents determined the first-written pattern is reloaded with new information. The new information is definitive of the pattern to be written on the next set of stripe areas in the respective subregions.

BRIEF DESCRIPTION OF THE DRAWING

A complete understanding of the present invention and of the above and other objects thereof may be gained from a consideration of the following detailed description of a specific illustrative embodiment thereof presented hereinbelow in connection with the accompanying drawing, in which.

DETAILED DESCRIPTION

Figure 1:
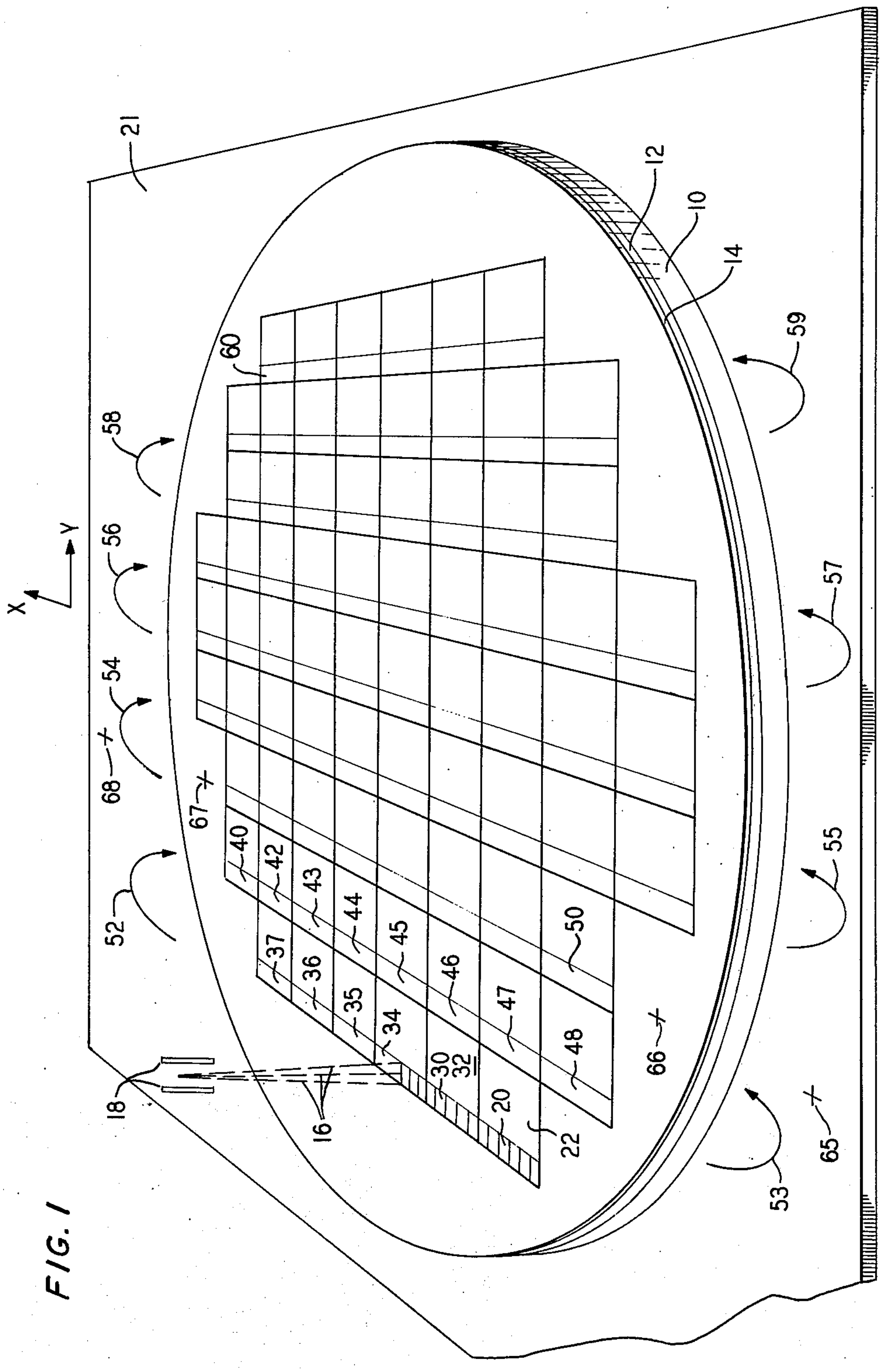
FIG. 1 shows a resist-coated wafer mounted on an X-Y table and diagramatically represents the manner in which the resist is irradiated by an electron beam in accordance with the principles of the present invention.

For illustrative purposes the main emphasis herein will be directed to the fabrication of a master mask which is suited for making microminiature integrated circuits by conventional contact printing techniques. The fabrication of such a mask comprises, for example, coating a glass substrate 10 (FIG. 1) with a coating of chrome 12 in a manner well known in the art. In turn, the chrome is covered with a layer of electron resist material 14 which is to be selectively irradiated by an electron beam. Wherever the beam impinges upon the resist 14, either polymer cross-linking or polymer chain scission occurs depending respectively on whether the resist layer 14 is of the negative or positive type. In the case of a negative resist, a developing solvent is then utilized to remove the unexposed polymer whereas in the case of a positive resist the exposed polymer is removed. Subsequently, the exposed portions of the chrome coating 12 are removed by, for example, standard etching or ion milling techniques. Then the remaining resist material is removed, thereby leaving an opaque chrome pattern on the transparent glass substrate 10. In turn, such a resulting master mask structure is utilized in a photolithographic contact printing system to replicate on a resist-coated silicon wafer the pattern defined by the chrome.

An electron beam exposure system made in accordance with the principles of the present invention is also well suited for making high-resolution master masks to be used in an x-ray lithographic printing system. The generalized depiction of FIG. 1 is also representative of the elements required to make that type of master mask. In that case the substrate 10 of FIG. 1 is advantageously a stretched Mylar film (Mylar is a registered trademark of E. I. Dupont de Nemours & Co.) which is stretched over and bonded to a dimensionally stable ring support member. The coating 12 is then selected to be a suitable X-ray absorptive material (such as gold) and the material 14 is an X-ray-resist material. (A stretched-Mylar mask structure for use in an X-ray lithographic system is disclosed in a copending application of G. A. Coquin, J. R. Maldonado and D. Maydan, Serial No. 442,921, filed Feb. 15, 1973.)

Alternatively, it is noted in passing that the generalized showing of FIG. 1 can also be considered representative of a resist-coated silicon wafer. In that case, the coating 12 is a layer of silicon dioxide and the material 14 is an electron-resist material. Selective irradiation of the material 14 by an electron beam, coupled with other conventional processing steps, can be utilized to form a high-resolution device directly on the wafer 10.

Various electron resist materials suitable for use as the layer 14 of FIG. 1 are known. A particularly sensitive electron resist of the negative type is disclosed in J. L. Bartelt-E. D. Feit U.S. Pat. No. 3,770,433, issued Nov. 6, 1973. Another high-sensitivity negative electron resist is disclosed in a copending application of J. L. Bartelt, Ser. No. 349,276, filed Apr. 9, 1973, which was abandoned on Feb. 20, 1975. Further, an advantageous positive electron resist exhibiting high sensitivity is disclosed in a copending application of M. J. S. Bowden, E. D. Feit and L. F. Thompson, Ser. No. 350,901, filed Apr. 13, 1973.

An electron beam directed at the resist layer 14 is represented diagramatically in FIG. 1 by dashed lines 16. The beam emanates from an apparatus 18 that is designed to move a small-diameter electron beam over a portion of the surface of the resist layer 14 is a controllable way. In particular, the apparatus or electron column 18 is characterized by a high-speed deflection capability in both the X and Y directions and by a high-speed beam blanking capability. Such apparatus is known in the art. A particularly advantageous version thereof is disclosed in a copending application of L. H. Lin, Ser. No. 363,024, filed May 23, 1973, which issued on Apr. 2, 1974, as U.S. Pat. No. 3,801,792.

Illustratively, it is assumed that the column 18 of FIG. 1 provides at the surface of the resist layer 14 an electron spot having a diameter of 0.5 microns. In the specific electron beam exposure system described herein the spot diameter is also assumed to be the so-called address length of the system.

Inside the column 18 of FIG. 1 are computer-controlled X and Y deflectors (also shown in FIG. 3) for directing the 0.5-$\mu$m-diameter electron spot to any address in, for example, a 140 × 140-$\mu$m electronic scan field. Within this field, a line having 256 equally spaced-apart address positions is written by the electron beam as it is horizontally deflected.

As the electron spot is deflected along a row of the scan field, the spot is intensity-modulated by the beam blanking plates at, for example, a 10 megahertz rate. This modulation rate corresponds with a single-address exposure time of 100 nanoseconds, which is compatible with the sensitivities of available electron resist materials.

The substrate or wafer shown in FIG. 1 is positioned on a conventional motor-driven table 21 that is mechanically movable in both the X and Y directions. Large-area exposure of the electron resist material 14 is achieved by moving the table 21 continuously and in synchronism with the scanning beam provided by the column 18. In this way an area as large as 10 × 10 centimeters can be exposed efficiently despite the aforementioned relatively small electronic scan field.

In FIG. 1 a major portion of the surface of the electron resist material 14 is represented as being divided into an array of squares arranged in rows and columns. These divisions are not actually lines formed in the resist material 14. They are included in the drawing only to assist in conceptualizing the subregions of the material 14 which are to be successively irradiated. For purposes of a specific illustrative example, 74 subregions arranged in 10 rows and 9 columns are shown in FIG. 1. Further, it will be assumed that each subregion is about 4 × 4 millimeters. In turn, each subregion of FIG. 1 will be regarded as being divided into multiple abutting stripe areas each 128 $\mu$m wide in the Y direction and 4 mm high in the X direction. Each stripe area is considered to have eight thousand rows parallel to the Y direction. Each 128-$\mu$m-wide row is regarded as having 256 address positions spaced apart 0.5 $\mu$m from each other. In addition, adjacent rows are considered to be spaced apart 0.5 $\mu$m.

In accordance with the principles of the present invention, corresponding stripe areas of the subregions represented in FIG. 1 are respectively irradiated in accordance with a predetermined beam modulation format. Illustratively, the format is determined by stored digital data that controls whether the electron beam is on or off during each of the 256 address positions in each of the eight thousand 128-$\mu$m-wide Y deflections in each stripe area. Thus, for example, a stored "1" signal corresponding to a particular address position causes the beam to be on during the time the beam is directed at the particular address position, whereas a "0" signal causes the beam to be blanked at that position. Accordingly, a memory having 8,000 × 256 (i.e., 2,048,000) stored bits is definitive of the electron beam exposure pattern to be imposed on a stripe area.

In FIG. 1, scanning of the electron beam commences, for example, in the leftmost stripe area 20 of the lower left-hand subregion 22. To help in better visualizing the raster scan mode of operation of the beam in traversing the area 20, a portion of the subregion 22 of FIG. 1 including the stripe area 20 is shown in FIG. 2.

Figure 2:
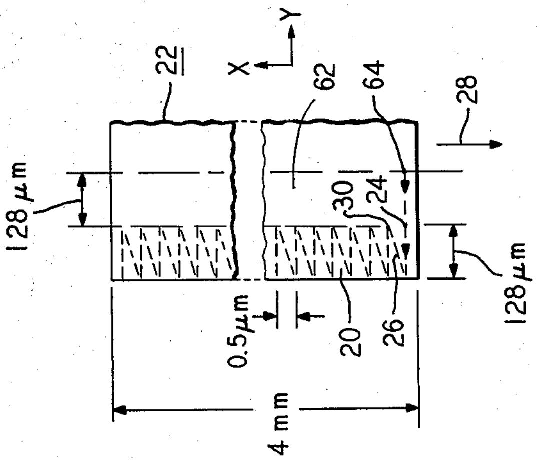
FIG. 2 depicts the raster scan mode of operation in a portion of the resist shown in FIG. 1.

The stripe area 20 of FIG. 2 is scanned by the aforementioned electron beam in a row-by-row fashion. Scanning commences in the bottom right-hand section of the area 20, at point 24. From that point the beam is deflected to the left along the indicated path which includes 256 address positions. During its right-to-left deflection the beam is intensity modulated at a 10 MHz rate.

Illustratively, each row of FIG. 2 is traversed by the electron beam in 25.6 microseconds. Between rows, so-called "flyback" of the beam occurs (see path 26). In one particular embodiment, the flyback time approximates 6 $\mu$sec. Thus if, during scanning, the area 20 is moved at a constant speed in the direction of arrow 28 at slightly less than 2 centimeters per second, the start (point 30) of the next row to be scanned will be exactly 0.5 $\mu$m above the starting point 24.

In accordance with one aspect of the principles of the present invention, the row-by-row scan of the stripe area 20 of FIG. 2 continues until all lines in the area 20 have been traversed by the electron beam. By irradiating selected ones of the address positions in the area 20, a predetermined pattern may be thereby established therein. Next, the stripe area 30 (FIG. 1) in the next adjacent subregion 32 is scanned in the same manner in accordance with the same pattern information. Accordingly, the contents of the 2,048,000-bit memory that stores this information is not changed but is simply identically reread in the course of scanning the 128-$\mu$m × 4-mm stripe area 30.

Subsequently, the leftmost stripe areas 34 through 37 in the remaining subregions of the left-hand column of FIG. 1 are irradiated in sequence. In each area the same stored pattern information is repeatedly determinative of the blanking format imposed on the electron beam.

After the stripe area 37 shown in FIG. 1 has been selectively exposed by the scanning beam, the table 21 is moved to position the beam above the stripe area 40 which is the first area in the next column of stripe areas to be exposed. In particular, table movement is such that the beam starts its first-row scan of the area 40 in the top right-hand portion thereof. After this two-dimensional movement to establish the starting point of the beam, scanning occurs as before, from right to left with a flyback between adjacent rows, as the table is moved in the X direction. Hence the area 40 is exposed from top to bottom (rather than from bottom to top as was the case in the previously exposed areas 20, 30 and 34 through 37). To achieve this, the aforementioned pattern-determinative contents of the 2,048,000-bit memory is read out (256 bits at a time) in reverse. Accordingly, the pattern established in the area 40 and in the other areas 42 through 48 in the second column of stripe areas is the same as that written into the stripe areas 20, 30 and 34 through 37 in the above-mentioned first column.

Subsequently, after irradiating the stripe area 48, the herein-considered system initiates another two-dimensional movement of the table 21. Such a movement positions the start of a beam scan at a point in the bottom right-hand corner of the stripe area 50 in the next column of stripe areas to be exposed.

By translating the table 21 in a continuous serpentine path under the beam, the remaining 59 stripe areas represented in FIG. 1 are then exposed. In accordance with the invention, exposure in each such area is determined by the same set of stored bits. Accordingly, every leftmost stripe area of the depicted subregions has the same pattern established therein.

The afore-described serpentine movement of the table 21 is represented in FIG. 1 by vectors 52 through 59 which indicate beam motion relative to table movement. After exposing the last stripe area 60 shown in FIG. 1, the table 21 is moved to position the electron beam again over the subregion 22. In particular, as shown in FIG. 2, the next stripe area to be irradiated is area 62 in the subregion 22.

During the time in which the table is moving to position the beam over the stripe area 62, the aforementioned pattern-determinative memory is loaded with another set of 2,048,000 bits. Hence, when scanning of the area 62 commences, at point 64 (FIG. 2), the new memory contents control the blanking format imposed on the beam. Then, in a manner identical to that described above, the area 62 and all other correspondingly-located stripe areas in the depicted subregions are irradiated in accordance with the new memory contents.

Successive identical cycles of operation of the type specified are effective to expose the subregions of FIG. 1 in a stripe-by-stripe fashion. After the subregions have been completely exposed, the resist layer 14 is ready to be processed in accordance with techniques well-known in the art, thereby to provide, illustratively, a master mask suitable for the high-resolution fabrication of integrated circuits.

An electron beam exposure system made in accordance with the principles of the present invention not only implements the afore-described raster scan mode of operation, but also automatically corrects for errors in the movement of the table 21. This is done by means of two conventional laser interferometers that continuously monitor the X and Y positions of the table. (For a description of such interferometer devices, employed in a pattern generating system that involves the scanning of a focused laser beam over a photographic plate, see D. R. Herriott-K. M. Poole-A. Zacharias U.S. Pat. 3,573,849, issued Apr. 6, 1971.) Electrical signals derived from these interferometers are utilized to deflect the electron beam in the X and Y directions to compensate for table movement errors (for example, errors stemming from nonuniform table speed). In one illustrative embodiment, repositioning the electron beam to compensate for such errors is rapid enough to maintain exposure of a pattern line accurate to within about 0.03 μm.

The exposure system described herein also includes a relatively low-speed error compensation feedback loop (to be described later below in connection with FIG. 3). This second-mentioned loop applies electrical signals (also derived from the interferometers) to X- and Y-direction servo motors that drive the table 21. In this way the table is moved to minimize positional errors.

As noted earlier above, the table 21 is continuously moving in the X direction as the electron beam is deflected from right to left in the Y direction. Nevertheless, the 256 address positions of the scanning beam in each row are disposed along a line parallel to the Y axis. No skewed scan results. This is so because the interferometers measure absolute table location to about a sixteenth of one address (approximately 0.03 μm). So, as will be described in more detail later below, each time the table moves a sixteenth of an address, the change in table position is fed back via the fast-compensation loop to deflect the beam to a corrected position. In that way the beam is controlled to write at successive row locations along a Y-parallel line.

The exposure system described herein relies on the aforementioned laser interferometers to provide an accurate indication of the position of the table 21. In addition, precise operation of the overall system presupposes an electron beam characterized by excellent short-term positional stability. As a practical matter, such stability of the beam is achievable in a well-engineered electron column (for example, one of the type disclosed in the above-cited Lin application). But it is important to monitor and correct for any long-term drift of the electron beam stemming from, for example, electrical or thermal effects. Illustratively, this is done by periodically interrupting the aforedescribed exposure process and moving the table 21 to precisely determined positions. When the table is so positioned, the relatively stable beam can be expected to be directed approximately at preformed topographical features marked on the surface of the table (for mask fabrication) or on the surface of the wafer itself (for device fabrication). Illustrative registration or fiducial marks 65 through 68 are shown in FIG. 1.

Prior to exposure, exact alignment of the beam scan with respect to the table 21 is carried out by temporarily operating the exposure system as a conventional scanning electron beam apparatus. During this latter mode of operation, the electron beam is controlled to scan the fiducial marks. This provides a basis both for aligning the electron beam scan with the table scan and for focusing the beam.

In the case of beam alignment during mask fabrication, a fine grid of metal bars covering a Faraday cup carried on the table 21 is effective to provide the desired fiducial features. When the scanning beam passes through holes in the grid into the Faraday cup, all the incident electrons are retained in the cup and detected. On the other hand, when the electron spot strikes a grid bar, a fraction of the incident electrons is reflected and secondary electrons are emitted. This reduces the net beam current that can be collected and detected as a registration signal. The time taken by the beam to encounter a precisely-positioned bar (as the beam scans from its undeflected origin) is a measure of any beam drift. In turn, compensation for any such drift is achieved by applying correction signals to control the position of the table 21.

Similarly, for establishing precise level-to-level registration during successive exposures (for device fabrication), topographical features are also utilized. Thus, for example, 0.5-$\mu$m-high ridges formed in silicon dioxide during the first lithographic processing step of device fabrication may be employed as fiducial marks during subsequent processing. By scanning the electron beam across such marks, the collected current is observed to vary as a function of topography. In particular, maximum reflection of electrons occurs at the edges of the marks. This variation is a basis for indicating beam position with respect to the reference marks on the wafer.

Figure 3:
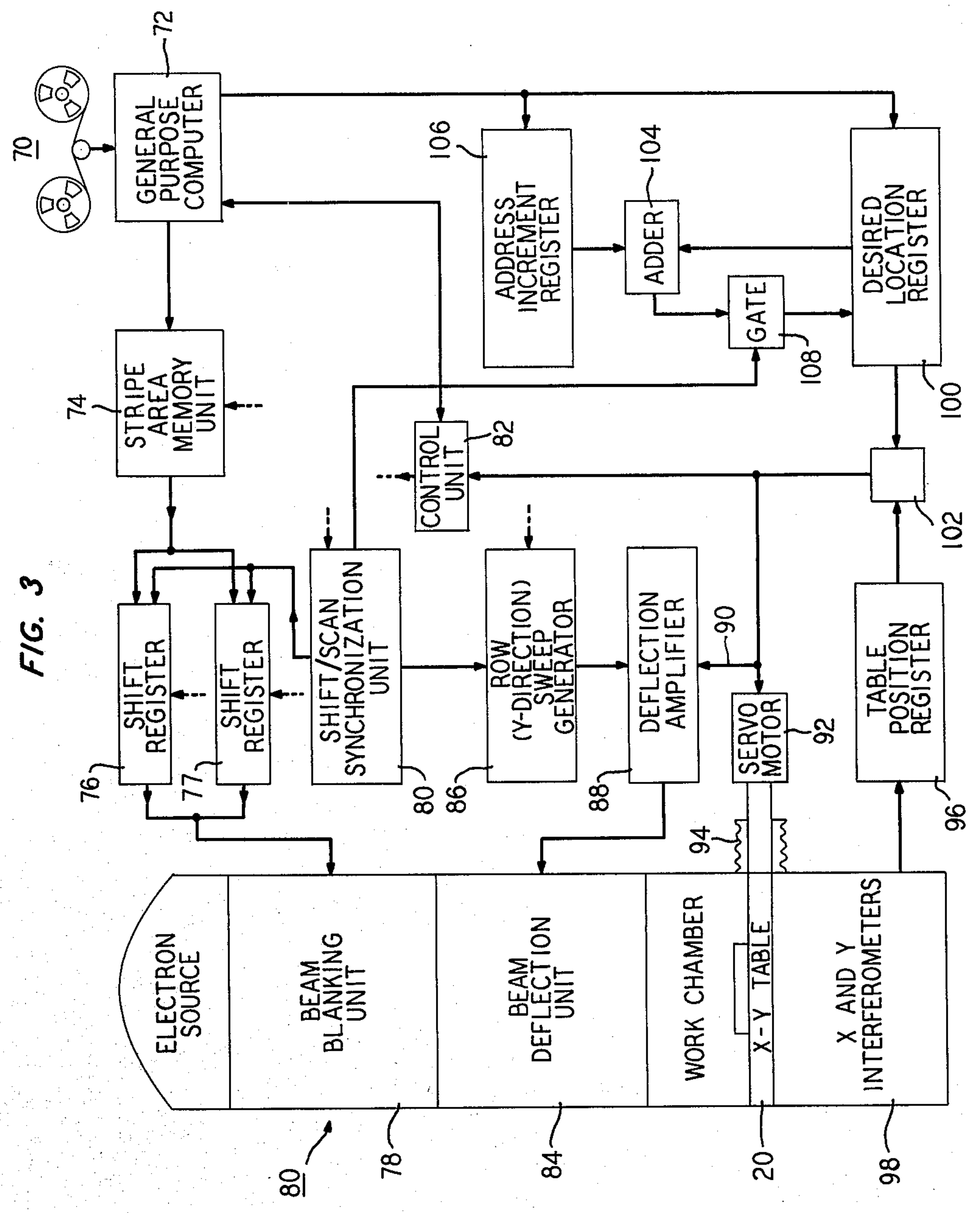
FIG. 3 is an overall block-diagram representation of an electron beam exposure system made in accordance with this invention.

FIG. 3 is a block diagram representation of a specific illustrative electron beam exposure system made in accordance with the principles of the present invention. Input data to the system is provided, for example, by a tape unit 70. Illustratively, this data is obtained by processing a standard XYMASK output file (see the Nov. 1970 *Bell System Technical Journal* issue for a description of the XYMASK system). In particular, the standard geometric formats stored in the XYMASK file are processed to form trapezoid-like figures. A group of such figures represents the pattern in a stripe area.

Before applying exposure data to a stripe area memory unit 74, the computer 72 further processes the trapezoid-like figures representative of a particular stripe area. More specifically, each file is converted to a set of rectangles whose sides are either parallel or perpendicular to the boundaries of a stripe area. Features with sloping sides are broken into plural rectangles with heights of one or more addresses. Data representative of both the location of a rectangle in the stripe area and the height and width of the rectangle is converted in the computer 72 to a raster format for storage in the memory unit 74.

The stripe area memory unit 74 is filled as follows: First it is cleared, that is, every bit storage location thereof is set to its 0 condition. Then a 1 representation is written into every bit location that corresponds to a physical location within the boundaries of the first rectangle to be represented. Filling of the unit 74 proceeds in a "half-cycle write" mode of operation. This has the effect of ORing the 1 of a rectangle currently being stored with any spatially coincident 1 representation of a previously stored rectangle. In this way, problems of superposition and possible double exposure are obviated.

If the depicted system is operated in the aforedescribed raster scan mode of operation, the memory unit 74 may be considered to store a bit map of a stripe area 256 address positions wide (128$\mu$m) by 8,000 address positions high (4mm). In one specific embodiment, filling of such a 2,048,000-bit unit takes only about one second for relatively complex pattern representations.

As indicated in FIG. 3, shift registers 76–77 are interposed between the stripe area memory unit 74 and the beam blanking unit 78 of electron column 80. One at a time of the registers 76–77 is alternately filled from the memory unit 74 with a bit-by-bit representation of one scan row of the stripe area. Thus, illustratively, a set of 256 bits is transferred from the unit 74 to one of the registers 76–77 to represent each of the 8,000 rows in a stripe area. Each such set of bits corresponds respectively to the 256 address locations in a row to be scanned. By way of example, each 1 bit in a set of 256 bits causes the beam to be unblanked at the corresponding address location whereas a 0 bit causes the beam to be blanked at the corresponding location.

The sequential application of data from one of the registers 76–77 to the beam blanking unit 78 commences in synchronism with the beginning of a scan by the electron beam along a row. In one specific embodiment of the invention, data is so applied at a rate of one bit every 100 nanoseconds. Shift register timing and row scan timing are coordinated (by units 80 and 82) so that each address position is exposed at exactly the correct location along each row scan parallel to the Y direction (see FIG. 1).

Coordination of the aforementioned shift registers 76–77 and synchronization unit 80 is achieved by applying signals thereto from a control unit 82. In response to information supplied to it by the computer 72, the control unit 82 initiates loading of one of the shift registers 76–77 and synchronizes itself with the unit 80 which is designed to run continually. Subsequently, the unit 80 initiates the readout of the loaded shift register and scanning of one row of the stripe area to be written is started. During such readout, the unit 82 directs the other shift register to be loaded from the memory unit 74 with the 256 bits definitive of the beam blanking format to be used during the scan of the next row. In that way the exposure process is not delayed by the necessity to wait for the loading of the other shift register before commencing the scan of the next row.

The control unit 82 is also designed to supply beam control status signals to the computer 72 and to establish scan length and other parameters, as specified by the computer. In addition, the unit 82 is adapted to control the electron column 80 to scan the aforementioned fiducial marks in the manner described above. Further, the unit 82 can be wired and/or programmed to control a variety of special operating modes such as, for example, any required for system maintenance and beam alignment.

Unit 84 in FIG. 3 includes X and Y deflectors for accurately controlling the movement of the electron beam. Y-direction scanning of the beam is carried out under control of generator 86 whose output is applied via amplifier 88 to the Y-deflection portion of the unit 84. Correction voltages applied to the amplifier 88 via lead 90 are effective to adjust the origin of the row scan to compensate for table position errors.

Illustratively, the scan generator 86 of FIG. 3 provides a 30 KHz sawtooth waveform that controls the 128-$\mu$m-wide raster scan utilized during the aforedescribed exposure process. During fiducial-mark detection a lower-frequency sawtooth is provided by the generator 86 for scanning purposes.

The system shown in FIG. 3 includes circuitry for continually determining the error, if any, that exists between the actual current position of the X-Y table 21 and its designated location. (The designated location is the intended or ideal table position for writing the next line or, if writing is in progress, the ideal position for the line currently being written.) Error signals generated by this circuitry are supplied to the deflection amplifier 88 to achieve a very rapid compensating deflection of the electron beam. In addition, such signals are applied via a servo motor 92 to a drive train 94 that is mechanically coupled to the table 21 to drive it in the X and/or Y directions to reduce the actual table position error. Advantageously, the motor 92 is a variable-speed unit.

Table position register 96 stores the X-Y coordinates (measured with respect to a reference origin on the table 21) of the present position of the X-Y table. The coordinates are determined in a conventional way by counting pulses provided by standard X and Y laser interferometers 98 (mounted on the table 21) as the table moves from its reference origin. Illustratively, each pulse represents a displacement of about 0.03$\mu$m.

Desired location register 100 contains the X-Y coordinates of the table position, as specified by the computer 72. By subtracting (in unit 102) the contents of the registers 96 and 100, a signal is obtained that is representative of table position error. The magnitude of this signal is sensed by control unit 82 which determines whether or not the table 21 is close enough to its intended location to allow writing to continue. If the error is sensed to be within prescribed limits, writing is allowed to proceed. In that event, the output of the subtractor unit 102 is applied to the deflection amplifier 88 to move the electron beam to the designated location in a high-speed manner. In any case this error signal is also applied to the servo motor 92 which mechanically drives the table 21 to minimize the difference between the contents of the registers 96 and 100.

After each Y-direction scan of the electron beam, the desired location register 100 is updated by one address position. This is done, for example, by adding (in unit 104) the contents of an address increment register 106 to the present contents of the desired location register 100. In the specific embodiment described herein, the value stored in the register 106 is ordinarily 0.5$\mu$m. But the value stored therein may be something else if, for example, it is necessary during device fabrication to compensate for deformations in the wafer being processed. In any event, gating into the register 100 of the new coordinate values of the next desired beam location is controlled by a "next-row-please" signal applied to gate 108 from the synchronization unit 80.

It is to be understood that the above-described arrangement is only illustrative of the application of the principles of the present invention. In accordance with these principles, numerous other arrangements may be devised by those skilled in the art without departing from the spirit and scope of the invention. For example, although emphasis herein has been directed to a mode of operation in which every row in a stripe area is scanned by a controlled beam, it is to be understood that other modes are contemplated. If, say, major segments in a stripe area are to be featureless (not irradiated), it may be advantageous to control the system not to scan such segments in a row-by-row way. By moving the table 20 at a higher-than-normal speed, it is possible to traverse such segments quickly without scanning and thereby shorten the overall processing time. Moreover, if there are repeated gaps (areas not to be irradiated) in the pattern to be written, it may be advantageous to drive the table 20 at a uniformly faster-than-normal rate.

In addition, although major emphasis above has been directed to a raster-scan mode of operation, it is to be understood that in accordance with the present invention successive corresponding stripe areas can be identically irradiated in succession in a random-access way. In this latter mode the memory unit 74 does not store a bit map of the stripe area. Instead, in that case the unit 74 contains, for example, coordinate information definitive of the contour of the pattern to be imposed on each of the set of corresponding stripe areas. It is a significant characteristic of the present invention that in either mode the contents of the unit 74 remain invariant until the entire set of corresponding stripe areas has been irradiated.

What is claimed is:

1. An exposure system for selectively irradiating each of multiple subregions of a radiation-sensitive resist layer, each of said subregions including plural abutting stripe areas, correspondingly-positioned stripe areas in said respective subregions constituting a set of such areas, a single pattern being respectively associated with each different set of stripe areas, said system comprising means for sequentially scanning a radiant beam over the plural sets of correspondingly-positioned stripe areas in said respective subregions in a set-by-set way, one stripe area at a time, in a two-dimensional way, and means for intensity modulating said radiant beam in accordance with plural specified patterns as the respective plural sets of correspondingly-positioned stripe areas are scanned.

2. A system as in claim 1 wherein said scanning means comprises means for raster scanning each of said stripe areas.

3. A system as in claim 2 wherein said raster scanning means includes means for scanning each of said stripe areas in its entirety in a line-by-line way.

4. Apparatus for defining a microminiature pattern in a resist layer disposed on a supporting substrate, said resist layer comprising a multitude of subregions in which multiple identical patterns are to be respectively defined, said subregions being arranged in a matrix of rows and columns, each such subregion being composed of plural abutting stripe areas, said apparatus comprising means for continuously moving a driven stage that carries said substrate to bring corresponding stripe areas of the subregions of a column within the limited-scan-area capability of a radiant beam, means for scanning said beam over corresponding stripe areas of the subregions of a column, means for controlling said stage movement to describe a serpentine path that brings corresponding stripe areas of successive columns within the scan capability of said beam, and means for modulating said beam in each of said corresponding stripe areas of said columns to form repeatedly the same pattern therein.

5. Apparatus as in claim 4 wherein said scanning means comprises means for raster scanning said beam over each of said stripe areas.

6. Apparatus as in claim 5 wherein said modulating means comprises an electron column including an electron beam blanking unit, a stripe area memory unit for storing a bit-by-bit representation definitive of the pattern to be formed in a set of correspondingly-positioned stripe areas, said representation comprising plural bits representative of each of multiple rows to be scanned within each stripe area, two shift registers responsive to the representation stored in said stripe area memory unit, each of said registers having a storage capacity equal to the number of plural bits per row of the stripe area to be scanned, and means for controlling the on-off state of said beam blanking unit in accordance with the bits stored in one of said shift registers and for loading plural bits into the other one of said shift registers from said memory unit during the time in which the one register is controlling said beam blanking unit.

7. Apparatus as in claim 6 further comprising an electron beam deflection unit included in said column, means for storing an indication of the absolute location of said stage, means for storing an indication of the desired location of said stage, and means responsive to the difference if any between said indications for applying an error signal representative of the difference to said deflection unit and to said moving means.

8. Apparatus as in claim 7 further comprising means for reloading said stripe area memory unit with another pattern representation during the time in which said stage is being moved by said moving means to position said beam over the first one of another set of correspondingly-positioned stripe areas.

9. Apparatus for selectively irradiating multiple subregions of a radiation-sensitive layer to define the same pattern in each of said subregions, each of said subregions being composed of plural abutting stripe areas, correspondingly-positioned stripe areas of said subregions adapted to have identical subpatterns defined therein, said apparatus comprising means for storing information representative of the subpattern to be defined in a set of correspondingly-positioned stripe areas, and means responsive to a particular subpattern representation contained in said storing means for repeatedly controlling the irradiation of each of a set of correspondingly-positioned stripe areas by identically scanning each such stripe area in a two-dimensional fashion.

10. Apparatus as in claim 9 further including means for reloading said storing means with information representative of the subpatterns to be defined in a next abutting set of correspondingly-positioned stripe areas during the time that elapses between the irradiation of the last stripe area in one set of correspondingly-positioned stripe areas and irradiation of the first stripe area in the next abutting set of correspondingly-positioned stripe areas.

11. A method of fabricating microminiature devices, which involves selectively irradiating multiple subregions of a radiation-sensitive resist layer to define the same pattern in each of said subregions, each of said subregions being composed of plural abutting stripe areas, correspondingly-positioned stripe areas of said subregions adapted to have identical subpatterns defined therein, said subregions of said layer being arranged in a matrix of rows and columns, said method comprising the steps of directing a radiant beam at said resist layer, controlling said beam to identically irradiate in sequence the stripe areas of a correspondingly-positioned set of stripe areas by following a serpentine path that traverses the stripe areas in adjacent columns of said matrix in opposite directions, and repeating said irradiation with respect to abutting sets of stripe areas to define the same pattern in each of said multiple subregions.

12. A method as in claim 11 wherein said resist layer is disposed on a planar layer, and further including the step of processing said irradiated resist layer and said planar layer to define multiple identical patterns in said planar layer.

13. A method as in claim 12 further including the step of directing radiant energy at the patterns defined in said planar layer to project a replica of said patterns onto a radiant-sensitive medium that is positioned adjacent to said planar layer.

* * * * *

UNITED STATES PATENT AND TRADEMARK OFFICE

CERTIFICATE OF CORRECTION

PATENT NO. : 3,900,737

DATED : August 19, 1975

INVENTOR(S) : Robert J. Collier and Donald R. Herriott

It is certified that error appears in the above-identified patent and that said Letters Patent are hereby corrected as shown below:

Column 1, line 56, "The while" should read --Then while--.
Column 2, line 56, "1973" should read --1974--.
Column 3, line 13, "is" should read --in--;
Column 3, line 42, after "wafer" insert --10--.

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*